United States Patent [19]

Hirsch et al.

[11] 4,145,556

[45] Mar. 20, 1979

[54] OXAMIDE STABILIZERS FOR ORGANIC MATERIALS

[75] Inventors: Richard H. Hirsch, Webster Groves; William H. Selcer, Kirkwood, both of Mo.

[73] Assignee: Monsanto Company, St. Louis, Mo.

[21] Appl. No.: 862,787

[22] Filed: Dec. 21, 1977

[51] Int. Cl.² .......................................... C07C 103/147
[52] U.S. Cl. ................................ 560/75; 260/45.85 B; 560/193
[58] Field of Search ................. 560/75; 260/45.9 NC, 260/45.85 B

[56] References Cited

U.S. PATENT DOCUMENTS

| | | | |
|---|---|---|---|
| 3,497,549 | 2/1970 | Dexter et al. | 560/75 |
| 3,649,667 | 3/1972 | Song et al. | 560/75 |
| 3,734,885 | 5/1973 | Muller et al. | 260/45.9 NC |
| 3,925,306 | 12/1975 | Schlicting et al. | 260/45.9 NC |
| 3,956,361 | 5/1976 | Stephen | 560/75 |
| 3,970,637 | 7/1976 | Hartless et al. | 260/45.85 B |

*Primary Examiner*—V. P. Hoke
*Attorney, Agent, or Firm*—George R. Beck

[57] ABSTRACT

Novel N,N'-bis[(alkylhydroxyphenyl)alkanoyloxyhydrocarbyl]oxamides which can be prepared by reacting an alkylhydroxyphenylalkanoic acid, an ester or anhydride thereof or a corresponding acid halide with an N,N'-bis(hydroxyhydrocarbyl)oxamide, are useful as stabilizers of organic materials normally subject to oxidative deterioration, e.g. polymers such as polyolefins.

20 Claims, No Drawings

OXAMIDE STABILIZERS FOR ORGANIC MATERIALS

BACKGROUND OF THE INVENTION

As is known, a variety of compounds have been found useful as stabilizers of organic materials (e.g. polymers such as polyolefins) against oxidative deterioration. Prominent among such compounds (herein also called antioxidants) are certain bis(alkylhydroxyphenyl)alkanoyl compounds such as bis[(alkylhydroxyphenyl)alkanoyloxyalkyl]iminoalkanes in U.S. Pat No. 3,441,575 issued Apr. 29, 1969 to M. Dexter et al., bis[(alkylhydroxyphenyl)alkanoylamido]alkanes in U.S. Pat. No. 3,584,047 issued June 8, 1971 to M. Dexter et al., N,N'-bis[alkylhydroxyphenyl)alkanoyl]hydrazines in U.S. Pat. No. 3,660,438 issued May 2, 1972 to M. Dexter and bis- and tris[alkylhydroxyphenyl]alkanoyloxyalkyl] compounds having a heterocyclic nucleus containing an imidodicarbonyl group in U.S. Pat. Nos. 3,763,093 issued Oct. 2, 1973 to G. Kletecka et al. and 3,707,542 issued Dec. 26, 1972 to D. H. Steinberg et al. Although some of those compounds are effective antioxidants, new methods utilizing other compounds which are more effective are very desirable.

It is also known that oxidative deterioration of many organic materials, e.g. polyolefins and particularly highly branched varieties thereof including polymers of propylene, is typically catalyzed (catalytically accelerated) in the presence of metal ions, e.g. ions of a heavy metal such as copper present in wire and cable commonly insulated with polyolefin or other organic materials, and that many compounds having good antioxidant properties in the absence of such metal ions are much less effective when such ions are present. Hence much attention has been paid to identification of compounds which inhibit such oxidation catalysis. In general and usually herein, such compounds are referred to as metal deactivators. Examples thereof are described in "Stabilization of Polypropylene" by R. H. Hansen et al., Poly. Eng. Sci. 5, 223 (1965), "New Antioxidant/Metal Deactivator System for Polyolefins Used in Wire and Cable Applications" by A. DiBattista et. al., Soc. Plast. Eng., Tech. Pap. 21, 280 (1975) and articles cited therein. Representative of such compounds are oxamide, oxanilide and oxalic acid benzylidene dihydrazide (commonly called "OABH") which is among those most widely used commercially. Typically, however, the compounds most effective as metal deactivators are not highly effective in stabilizing organic materials against the oxidative deterioration that occurs in the absence of metal ions.

Ideally, for stabilization of organic materials in the presence of metal ions, a compound would be "bifunctional", i.e., effective as both antioxidant and metal deactivator. See "Synthesis and Evaluation of New Stabilizers for Polyethylene Insulation" by R. L. Hartless et al., Amer. Chem. Soc., Div. of Org. Coatings and Plastics Chem., Preprints 34, No. 2 (Sept. 1974) which suggests such use of several compounds including the condensation product of 3,5-di-tert-butyl-4-hydroxybenzaldehyde with oxalyl dihydrazide, i.e., OABH having 4-hydroxy and 3,5-di-tert-butyl substituents on each phenyl ring.

Unfortunately, that compound suggested by Hartless et al. isn't notably effective, and extensive efforts to provide a more effective bifunctional compound by altering substituents on compounds of that general type have been generally disappointing. As observed in the article by Hartless et al., "It would be interesting to speculate on the chemical effect of substituent alterations but unequivocal conclusions are precluded for several reasons. Physical differences (solubility, diffusion rates, particle sizes, etc.) between the compounds may be more important than chemical differences."

Accordingly, new compounds which are advantageously effective as stabilizers of organic materials against oxidative deterioration are very desirable, and it is also very desirable to provide new compounds which are highly advantageous in deactivation of metal ions which catalyze the oxidative deterioration of such materials. In particular, it is very desirable to provide new compounds which are advantageously useful both for deactivation of metal ions to inhibit such catalysis and for stabilization of organic materials against oxidative deterioration which occurs in the absence of such metal ions. In view of the wide-spread use of polymers such as various polyolefins in environments conducive to oxidative deterioration, new compounds which are specifically advantageous for any or all of those purposes in such polymers are especially desirable. Accordingly, it is an object of this invention to provide such compounds. Other objects will be apparent from the following in which percentages are by weight and temperatures are Centigrade except where otherwise noted.

SUMMARY OF THE INVENTION

In accordance with the present invention, the aforementioned advantages are provided by new compounds having the structural formula

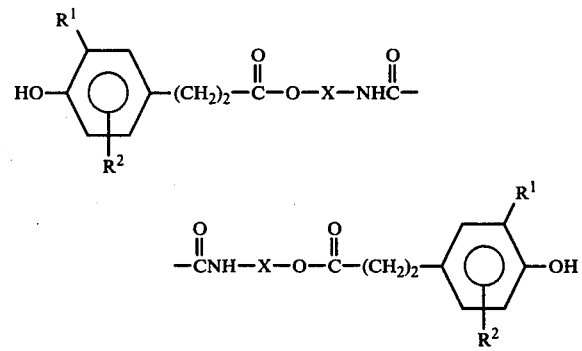

in which each $R^1$ is independently alkyl having up to about 8 carbon atoms including a tertiary carbon atom directly linked to the phenolic ring on which that $R^1$ is a substituent, each $R^2$ is independently H or alkyl having up to about 8 carbon atoms, and each X is independently a divalent hydrocarbon radical containing up to about 12 carbon atoms including from from 1 to about 10 carbon atoms forming the shortest chain linking the adjacent

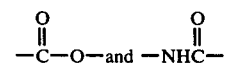

radicals in said compound.

These compounds are advantageously useful in conjunction with a great variety of organic materials, and especially with various organic polymeric materials such as, e.g. polyolefins and especially polyethylene (high or low density) and copolymers of propylene and ethylene. In particular, these compounds are advantageously useful for stabilization of such materials in the presence of a metal (e.g. a heavy metal such as copper) which catalyzes the oxidative deterioration of such materials.

DESCRIPTION OF PREFERRED EMBODIMENTS

As used herein, polyolefin means a polymer of olefinically (most commonly α-olefinically) unsaturated monomers which can be unsubstituted and/or substituted olefinic hydrocarbons. Also as used herein, copolymer of propylene and ethylene means a copolymer of monomers consisting essentially of propylene and ethylene (at least about 0.5% and usually between about 1% and about 15% ethylene) such as, e.g. random propylene-/ethylene copolymers containing from about 1% to about 3% ethylene and block propylene/ethylene copolymers containing from about 5% to about 15% ethylene.

In the foregoing formula each $R^1$, by including a tertiary carbon atom linked directly (i.e., through no other atom(s)) to the phenolic ring on which that $R^1$ is a substituent, is tertiary alkyl (e.g. t-butyl, t-amyl or t-octyl). Preferably, $R^1$ is t-butyl. Although $R^2$ may be H or alkyl having from 1 to about 8 carbon atoms, it is also desirably alkyl defined as $R^1$ herein, preferably t-butyl, and is also preferably situated ortho to the hydroxy radical on the phenolic ring on which that $R^2$ is a substituent. Each X in the foregoing formula is a divalent radical consisting of hydrogen and from 1 to about 12 carbon atoms. From 1 to about 10 (typically not more than about 6) of those carbon atoms are the linking atoms in the shortest chain (the chain containing the least number of carbon atoms) between the

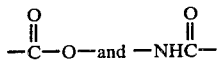

radicals adjacent that X in the formula. Thus, that chain may be all or part of the carbon skeleton of an aliphatic radical, e.g. an acyclic alkylene ($C_nH_{2n}$) radical, a nonmajor portion of a cyclic hydrocarbon radical (e.g. 2 or 3 consecutive carbon atoms in a phenylene or cyclohexylene ring) or a combination thereof. Preferably X contains no olefinic unsaturation, and said chain contains preferably at least 2 carbon atoms and preferably not more than about 5 carbon atoms. Also preferably, each X contains not more than about 6 carbon atoms and thus can be desirably selected from phenylene and alkylene (cyclic or acyclic) containing up to about 6 carbon atoms.

For uses of the compounds of this invention in stabilization of organic materials in the presence of metal ions which catalyze the oxidative deterioration of such materials, and particularly for stabilization of polyolefins such as polyethylene and propylene/ethylene copolymers in the presence of such ions, each X is advantageously not highly branched or otherwise sterically prominent in more than one direction. Thus when X is aliphatic, it preferably contains not more than about 1 carbon atom more than the number of carbon atoms in said shortest linking chain. Also for such uses when X is aliphatic it is preferably a non-tertiary (devoid of tertiary carbon atoms) radical and, even more desirably, such a radical containing 2 or 3 carbon atoms, i.e., n-propylene, isopropylene, or most advantageously for many uses, ethylene. Similarly, when X contains a phenylene radical, it is preferably meta-phenylene or, most advantageously for many uses, ortho-phenylene.

The foregoing describes preferred embodiments of the compounds of this invention. However, other compounds similar to those expressly described herein but differing somewhat structurally therefrom should be considered equivalents thereof to the extent that such differences do not preclude the advantageous properties of the novel compounds disclosed herein. E.g. such equivalent compounds may contain only one or more than two methylene groups in each of the alkylene radicals linking a hydroxyphenyl ring and a carbonyloxy radical therein, there may be one or more side chains (e.g. an alkyl substituent) on such alkylene radicals, the hydroxy radicals on the phenyl rings may be situated other than para (e.g. ortho) to the chain linking those rings, $R^1$ and $R^2$ may contain more than about 8 carbon atoms and/or carbon branching different from that specifically described herein, X may contain more than about 12 carbon atoms and/or the aforesaid shortest linking chain comprised by X may contain more than about 10 carbon atoms.

The compound represented by the foregoing formula when each $R^1$ is tertiary butyl, each $R^2$ is tertiary butyl ortho to the hydroxy radical on the phenolic ring on which that $R^2$ is a substituent, and each X is ethylene, is herein designated N,N'-bis[2-[3-(3,5-di-t-butyl-4-hydroxyphenyl)propionyloxy]ethyl]oxamide (hereinafter BPEO). That compound can be prepared by reacting a lower alkyl (e.g. methyl, ethyl or n-butyl) ester of 3-(3,5-di-t-butyl-4-hydroxyphenyl)propionic acid with ½ of an equimolar amount of N,N'-bis(2-hydroxyethyl)oxamide. Preferably the reaction is carried out at a temperature between about 25° and about 250°, and in the presence of a suitable transesterification catalyst such as, e.g. stannous oxalate, dibutyl tin oxide or titanium tetrachloride or tetra($C_3$-$C_4$)alkoxide. Also preferably the reaction is carried out above the melting point of the oxamide reactant (172°-73°) to permit carrying out same without an extraneous reaction solvent. Thus most desirably the reaction is carried out between about 175° and about 230°, and even more desirably at a temperature of at least about 185°. The propionic acid esters used in that reaction and preparation thereof are described in U.S. Pat. Nos. 3,330,850 issued May 2, 1972 and 3,364,250 issued Jan. 16, 1968 to M. Dexter et al. Similar esters containing only one or more than two methylene groups in the alkylene radical linking the hydroxyphenyl ring and carbonyloxy radical therein can be prepared as described by V. V. Ershov et al. in Izv. Akad. Nauk. SSSR, Ser. Khim 7, 1301 (1965). N,N'-bis(2-hydroxyethyl)oxamide can be prepared as described by A. P. Phillips in J. Amer. Chem. Soc. 73, 5557 (1951) and W. H. Rauscher in J. Amer. Chem. Soc. 70, 438 (1948), i.e., by reacting ethanolamine with dimethyl or diethyl oxalate.

Alternatively, BPEO can be made by reacting N,N'-bis(2-hydroxyethyl)oxamide with 3-[3,5-di-t-butyl-4-hydroxyphenyl]propionic acid, which can be prepared from the aforesaid esters by conventional hydrolysis, or with the anhydride of that acid. In another preparation of BPEO, that same acid can be converted to a corresponding acid halide by reaction with $SOCl_2$ or $SOBr_2$ in a suitable solvent (e.g. hexane) and then reacted with N,N'-bis(2-hydroxyethyl)oxamide.

Compounds of this invention in which $R^1$ and/or $R^2$ are other than t-butyl can be made by analogous procedures using differently alkylated phenols. Compounds in which X is other than ethylene can be made by analogous procedures in which the N,N'-bis(2-hydroxyethyl)oxamide is replaced with a different N,N'-bis(hydroxyhydrocarbyl)oxamide in which each hydrocarbyl radical is X as defined herein. Such oxamides can be made by reacting dimethyl or diethyl oxalate with the appropriate aminophenol, cycloalkanolamine or alkanolamine.

In another preparation of compounds of this invention, a suitably-alkylated hydroxyphenylalkanoic acid is converted to its chloride and then reacted with an appropriate nitro-alcohol to obtain the corresponding nitro-hydrocarbyl ester which is reduced to the corresponding amine and then reacted with oxalyl chloride.

The organic materials which can be stabilized by compounds of this invention include polyolefins which can be homopolymers of unsubstituted olefinic hydrocarbons such as, e.g. ethylene, propylene, 1-butylene, 1,3-butadiene and styrene, homopolymers of unsubstituted olefinic hydrocarbons such as, e.g. vinyl halides such as vinyl chloride and esters such as acetate, vinyl alcohols, acrylonitrile and methacrylonitrile, or copolymers of two or more of such substituted and/or unsubstituted olefinic hydrocarbons. Also included are condensation polymers such as, e.g. polyalkylene oxides, polyurethanes, polycarbonates, polyesters such as polyethylene terephthalates and polyamides such as polyhexamethylene adipamide and polycaprolactam. Other organic materials which can be stabilized by this invention include lubricating oils, e.g. of the aliphatic ester type such as di(2-ethylhexyl)azelate and pentaerythritol tetracaprolate, animal and vegetable derived oils such as linseed oil, fat, tallow, lard, peanut oil, cod liver oil, castor oil, palm oil, corn oil and cottonseed oil, fatty acids such as soaps, and other hydrocarbon materials such as gasoline, mineral oil, fuel oil, drying oil, cutting fluids and waxes.

In general, one or a mixture of the compounds of this invention is employed in a concentration between about 0.005% and about 5% of the organic material to be stabilized, although more or less can be used if desired. In many such organic materials, including particularly polyolefins, it is typically preferred to use such compounds in a concentration between about 0.01% and about 2%. In polymers of unsubstituted olefinic hydrocarbons such as, e.g. polyethylene or a copolymer of ethylene and propylene, it is generally most advantageous to use between about 0.5% and about 1%. For best results, such compounds should be generally dispersed substantially uniformly throughout the material to be stabilized. Any suitable dispersion technique (e.g. melt-blending) can be used. If desired, and in some cases very advantageously, such compounds can be employed in combination with other stabilizers, e.g. dilauryl or distearyl $\beta$-thiodipropionate, antiozonants, thermal stabilizers, ultraviolet light absorbers and/or with coloring materials, dyes, pigments, metal chelating agents, etc.

The following examples are illustrative only and do not imply any limitations on the scope of this invention.

EXAMPLE I 3-(3,5-di-t-butyl-4-hydroxyphenyl)propionic acid (5.6 g; 0.02 mole) and thionyl chloride (5 g; 0.04 mole) are refluxed in 50 ml heptane for 20 hrs. The resulting solution is concentrated, N,N'-bis(2-hydroxyethyl)oxamide (1.8 g; 0.01 mole) and 50 ml dry toluene are added and refluxing is continued another 24 hrs. Cooling precipitates a white solid which, when recrystallized from ethanol, has a m.p. of 134°-36° and analytical data (infrared and nuclear magnetic resonance spectra) consistent with that expected for N,N'-bis-[2-[3-(3,5-di-t-butyl-4-hydroxyphenyl)propionyloxy]ethyl]oxamide (BPEO). Yield was 4.8 g (69%). Found: C, 68.16%; H, 8.96%; N, 4.38% (theoretical: C, 68.93%; H, 8.68%; N, 4.02%).

EXAMPLE II

When Example I is repeated except that 2.6 g (0.01 mole) of o,o'-bis-hydroxy-oxanilide is the oxamide reactant, there is produced 5.5 g (69% yield) of a solid having a m.p. of 187°-91° and analytical data consistent with that expected for o,o'-bis[3-(3,5-di-t-butyl-4-hydroxyphenyl)-propionyloxy]oxanilide (hereinafter OBPO).

EXAMPLE III

When Example I is repeated except that 2.0 g (0.01 mole) of N,N'-bis(2-hydroxypropyl)oxamide is the oxamide reactant, there is produced 6.0 g (83% yield) of a solid having a m.p. of 124°-28° and analytical data consistent with that expected for N,N'-bis[2-[3-(3,5-di-t-butyl-4-hydroxyphenyl)propionyloxy]propyl]oxamide (hereinafter B2PO).

EXAMPLE IV 3-(3,5-di-t-butyl-4-hydroxyphenyl)propionic acid (5.6 g; 0.02 mole) and thionyl chloride (5 g; 0.04 mole) are refluxed in 50 ml heptane for 5 hrs. The resulting solution is concentrated and m-nitrophenol (2.8 g; 0.02 mole) and 50 ml dry toluene are added. After refluxing another 20 hrs, the solvent is evaporated and the residue is recrystallized from 100 ml ethanol. 4.0 g. of the resulting solid is reduced in 100 ml methanol in the presence of 5% Pd on C in $H_2$. When uptake ceases, the catalyst is separated by filtration and the solvent is evaporated. The residue is treated with oxalyl chloride (0.63 g; 0.05 mole) in 75 ml dry toluene. The solution is refluxed for 5 hrs and then concentrated. The residue is recrystallized from 25 ml toluene, providing a solid having a m.p. of 113°-17° and analytical data consistent with that expected for m,m'-bis[3-(3,5-di-t-butyl-4-hydroxyphenyl)propionyloxy]oxanilide (hereinafter MBPO). Yield was 2.1 g (53%).

EXAMPLE V

When Example I is repeated except that 2.0 g (0.01 mole) of N,N'-bis(3-hydroxypropyl)oxamide is the oxamide reactant, there is produced 6.7 g (92% yield) of a solid having a m.p. of 119°-22° and analytical data consistent with that expected for N,N'-bis[3-[3-(3,5-di-t-butyl-4-hydroxyphenyl)propionyloxy]propyl]oxamide (hereinafter B3PO).

EXAMPLE VI

When Example IV is repeated except that 2.8 g (0.02 mole) of p-nitrophenol is substituted for the m-nitrophenol, there is produced 2.2 g (55% yield) of a solid having a m.p. of 184°-88° and analytical data consistent with that expected for p,p'-bis[3-(3,5-di-t-butyl-4-hydroxyphenyl)propionyloxy]oxanilide (hereinafter PBPO).

EXAMPLE VII

When Example I is repeated except that 2.6 g (0.01 mole) of N,N'-bis(5-hydroxyamyl)oxamide is the oxamide reactant, there is produced 4.0 g (51% yield) of a solid having a m.p. of 132°–35° and analytical data consistent with that expected for N,N'-bis[5-[3-(3,5-di-t-butyl-4-hydroxyphenyl)propionyloxy]amyl]oxamide (hereinafter BPAO).

EXAMPLE VIII

When Example I is repeated except that 2.2 g (0.01 mole) of N,N'-bis(2-hydroxy-1,1-dimethylethyl)oxamide is the oxamide reactant, there is produced 3.6 g (48% yield) of a solid having a m.p. of 156°–59° and analytical data consistent with that expected for N,N'-bis[2-[3-(3,5-di-t-butyl-4-hydroxyphenyl)propionyloxy]-1,1-dimethylethyl]oxamide (hereinafter BPDEO).

Examples IX–XIV describe tests carried out to evaluate the compounds of this invention as stabilizers of organic materials against oxidative degradation. Since organic materials normally oxidize slowly at ambient temperatures, even in the absence of antioxidant compounds, the testing of such compounds must be conducted at elevated temperatures to obtain results within a reasonable time. Hence the following tests were conducted at 120°–140°. All polymers employed in these tests were unstabilized except as specifically noted herein.

EXAMPLE IX

Compounds prepared in Examples I–VIII and other stabilizers were incorporated in a concentration of 0.35% in a wire and cable grade copolymer of propylene and 1–15% ethylene. In the case of each compound, a 40 g sample was made by fusing a dry-blended mixture of that compound and the copolymer resin in a Brabender mixer at 180°, preheating without mixing for 3 min. and then mixing for 5 min. at a rotor speed of 70 rpm. A 0.6 mm-thick sheet was prepared from each composition by compression molding in a picture frame mold at 180° using molding cycles of 3 min. under no added pressure and then 2 min. at 3400 atm. followed by quench-cooling in water. A 0.9 mm-thick sandwich was prepared by laminating a 4 cm × 10 cm piece of 40 mesh/cm Cu screen between 2 pieces of the sheet in a 180° mold using molding cycles of 2 min. with no added pressure followed by 1 min. at 2040 atm. and then quench-cooling in water. Each sandwich was aged at 140° in a circulating hot air oven equipped with a rotating sample holder until obvious physical failure evidenced by cracking, crazing and/or powdering, with the following results:

TABLE A

| Compound Exmployed (0.35%) | Hours to Failure |
|---|---|
| OBPO (Ex. II) | 1550 |
| BPEO (Ex. I) | 1500 |
| MBPO (Ex. IV) | 1375 |
| B2PO (Ex. III) | 1300 |
| B3PO (Ex. V) | 1125 |
| PBPO (Ex. VI) | 1025 |
| BPAO (Ex. VII) | 888 |
| Goodrite 3125[1] | 625 |
| Irganox 1024[2] | 525 |
| BPDEO (Ex. VIII) | 500 |
| BPO[3] | 412 |
| BPEO thio-oxamide analog[4] | 72 |
| BEO[5] | 48 |
| BPEO oxalate isomer[6] | 48 |

TABLE A-continued

| Compound Exmployed (0.35%) | Hours to Failure |
|---|---|
| None | 24 |

[1]B. F. Goodrich Co. product 2,2',2''-tris[3-(3,5-di-t-butyl-4-hydroxy (phenyl)propionyloxyethyl]isocyanurate.
[2]Ciba-Geigy Corp. product N,N'-bis[3-(3,5-di-t-butyl-4-hydroxyphenyl)propionyl]-hydrazine.
[3]N,N'-bis[3,(3,5-di-t-butyl-4-hydroxyphenyl)propyl]-oxamide.
[4]N,N'-bis[2-[3-(3,5-di-t-butyl-4-hydroxyphenyl)propionyl-oxy]ethyl]thio-oxamide.
[5]N,N'-bis[2-(3,5-di-t-butyl-4-hydroxybenzoyloxy)ethyl]-oxamide.
[6]Bis[2-[3-(3,5-di-t-butyl-4-hydroxyphenyl)propionamido]-ethyl]oxalate.

EXAMPLE X

Various concentrations of BPEO (Ex. I) were evaluated for stabilization of communications cable primary insulation in comparison with a standard concentration of a commercially employed combination of Irganox 1024 and OABH. In a first set of tests simulating aging in unfilled (air-core) cable, Cu screen-containing samples of a propylene/ethylene copolymer were prepared and aged as described in Example IX. In a second set simulating aging in filled cable, duplicate sandwiches were dipped in a standard petroleum jelly cable filler compound (Witco 13C) for 1 min. at 115°–20°, aged at 70° for 10 days, wiped clean and then aged as described hereinbefore but at 120°. Results were as follows:

TABLE B

| Compound(s) Employed | Hours to Failure | |
|---|---|---|
| | Undipped Samples | Dipped Samples |
| 0.25% Irganox 1024 and 0.1% OABH | 340 | 370 |
| 0.05% BPEO | 140 | 125 |
| 0.10% BPEO | 360 | 270 |
| 0.15% BPEO | 700 | 450 |
| 0.20% BPEO | 1090 | 630 |
| 0.25% BPEO | 1310 | 750 |
| 0.30% BPEO | 1480 | 980 |
| 0.35% BPEO | 1660 | 980 |
| 0.40% BPEO | 1760 | 1120 |
| 0.45% BPEO | 1860 | 1200 |
| 0.50% BPEO | 1900 | 1360 |

EXAMPLE XI

Compounds prepared in Examples I–VIII and other stabilizers were incorporated in a concentration of 0.25% together with 0.1% OABH in a propylene/ethylene copolymer, and sandwiches were made of the resulting compositions as described in Example IX. The effectiveness of each compound was evaluated as described for "undipped" samples in Example X (140° hot air oven) with the following results:

TABLE C

| Compound Employed (0.25% togehter with 0.1% OABH | Hours to Failure |
|---|---|
| OBPO (Ex. II) | 1032 |
| Irganox 1010[1] | 972 |
| MBPO (Ex. IV) | 864 |
| Goodrite 3125 | 831 |
| BPEO (Ex. I) | 814 |
| B2PO (Ex. III) | 792 |
| B3PO (Ex. V) | 684 |
| PBPO (Ex. VI) | 684 |
| BPDEO (Ex. VIII) | 546 |
| BPAO (Ex. VII) | 480 |
| Irganox 1024 | 430 |
| BPEO oxalate isomer[2] | 72 |
| BPEO thio-oxamide analog[3] | 48 |
| BEO[4] | 48 |

[1]Ciba-Geigy Corp. product tetrakis[methylene-3-(3,5-di-t-butyl-4-hydroxyphenyl)-propionyloxy]methane.
[2,3,4]See Table A.

EXAMPLE XII

BPEO (Ex. I) was evaluated for stabilization of high density polyethylene in comparison with other compounds effective for that purpose. Samples for these tests were prepared using pellets of a conventional wire and cable grade high density polyethylene (duPont Alathon 5496) in a Brabender mixer at 180°. After addition of 0.1% of an antioxidant compound and 0.1% of a metal deactivator (0.2% when the same compound is used as both) based on the polymer weight, the molten polymer was mixed for 5 min. at a rotor speed of 70 rpm. Cu screen-containing sandwiches were prepared as described in Example IX except that 32 mesh/cm Cu screen was used. Aging was carried out as in Example X except that both dipped and undipped samples were aged at 120°. Results were as follows:

TABLE D

| Antioxidant Compound (0.1%) | Metal Deactivator (0.1%) | Hours to Failure Undipped Samples | Dipped Samples |
|---|---|---|---|
| BPEO | BPEO | 2500 | 1700 |
| Irganox 1024 | Irganox 1024 | 2320 | 1700 |
| Irganox 1010 | Irganox 1010 | 840 | 670 |
| Irganox 1010 | BPEO | 2530 | 1190 |
| Irganox 1024 | BPEO | 2410 | 1400 |
| Irganox 1010 | Irganox 1024 | 2340 | 1120 |
| Irganox 1010 | OABH | 1800 | 1200 |
| BPEO | OABH | 1450 | 1010 |
| Irganox 1024 | OABH | 1310 | 990 |

EXAMPLE XIII

Compounds prepared in Examples I–VIII and other compounds having antioxidant properties were incorporated in a conventional general purpose molding-grade block copolymer of approximately 90% propylene and 10% ethylene. In these tests, 40 g. samples were prepared by dry-mixing the powdered copolymer with 0.2% of the antioxidant compound based on the copolymer weight, preheating the mixture for 3 min. in a Brabender mixer at 180° and then mixing for 5 min. at a rotor speed of 70 rpm. A 0.9 mm-thick sheet was prepared from each composition by compression molding at 180° in a picture frame mold. Molding cycles were 3 min. at no added pressure and then 2 min. at 3400 atm. followed by quench-cooling in water. A 2.5 cm × 5.5 cm sample was cut from each molding sheet and aged in a circulating hot air oven at 140° with the following results:

TABLE E

| Antioxidant Compound (0.2%) | Hours to Failure |
|---|---|
| OBPO (Ex. II) | 1740 |
| MBPO (Ex. IV) | 1728 |
| BPEO (Ex. I) | 1692 |
| Irganox 1010 | 1640 |
| B3PO (Ex. V) | 1608 |
| B2PO (Ex. III) | 1584 |
| Goodrite 3125 | 1536 |
| BPAO (Ex. VII) | 1464 |
| BPEO thio-oxamide analog[1] | 1320 |
| BPDEO (Ex. VIII) | 1176 |
| PBPO (Ex. VI) | 1152 |
| BPEO glycine isomer[2] | 1152 |
| Irganox 1035[3] | 1104 |
| BPEO dihydraizide variation[4] | 984 |
| Irganox 1024 | 912 |
| BPEO isomer homolog[5] | 864 |
| BPEO oxalate isomer[6] | 96 |

TABLE E-continued

| Antioxidant Compound (0.2%) | Hours to Failure |
|---|---|
| None | 24 |

[1,6]See Table A.
[2]N,N'-oxalylbis[glycine [3-(3,5-di-t-butyl-4-hydroxy-phenyl)propyl]ester].
[3]Ciba-Geigy corp. product bis[2-[3-(3,5-di-t-butyl-4-hydroxyphenyl)propionyloxy]ethyl]sulfide.
[4]N,N''''-bis[2-[3-(3,5-di-t-butyl-4-hydroxyphenyl)propionyloxy]ethyl]oxalyl dihydrazide.
[5]N,N'-oxalylbis[β-alanine[3-(3,5-di-t-butyl-4-hydroxyphenyl)propyl]ester].

EXAMPLE XIV

Compounds prepared in Examples I–VIII were incorporated in a conventional general purpose molding grade homopolymer of propylene (Exxon E-115). Tests were carried out using the compounds in two ways, i.e., as the sole antioxidant in a concentration of 0.2%, and as an antioxidant in a concentration of 0.1% together with 0.25% of antioxidant synergist dilaurylthiodipropionate. All concentrations were based on the weight of polymer employed. Samples were prepared by combining the homopolymer and antioxidant compound(s) in a Brabender mixer, heating at 180° without mixing for 3 min. and then with mixing for 5 min. at a rotor speed of 50 rpm. A 0.9 mm-thick sheet was prepared from each composition by compression molding at 180° in a picture frame mold with molding cycles of 3 min. at no added pressure, 2 min. at 4080 atm. and 3–4 min. cooling in the mold under pressure. 2.5 cm × 5.5 cm samples cut from the resulting sheets were aged in a circulating hot air oven at 140° with the following results:

TABLE F

| Antioxidant Compound | Hours to Failure 0.2%- No Synergist | 0.1% +0.25% Synergist Included |
|---|---|---|
| BPAO (Ex. VII) | 792 | 1110[1] |
| B2PO (Ex. III) | 480 | 650 |
| B3PO (Ex. V) | 430 | 815 |
| BPDEO (Ex. VIII) | 185 | 835 |
| BPEO (Ex. I) | 175 | 250 |
| PBPO (Ex. VI) | 120 | 290 |
| MBPO (Ex. IV) | 120 | 215 |
| OBPO (Ex. II) | 50 | 290 |
| None | 24 | — |

[1]Still running with no sign of imminent failure.

From the foregoing data, it is apparent that compounds of this invention are advantageously useful in stabilization of organic materials such as polyolefins against oxidative deterioration in the presence of a metal which catalyzes such deterioration, and also advantageously useful for stabilization of organic materials in the absence of such a metal. It is particularly apparent that in the presence of such a metal, compounds of this invention provide very significant stabilization advantages without use of any other stabilizer and that such advantages are surprisingly great, especially in view of the much less attractive results provided by alternate use of other compounds of only modestly different structure.

What is claimed is:

1. A compound having the structural formula

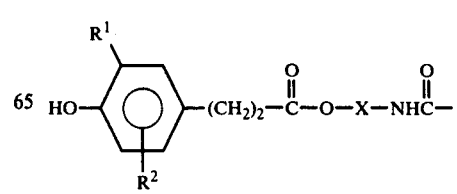

-continued

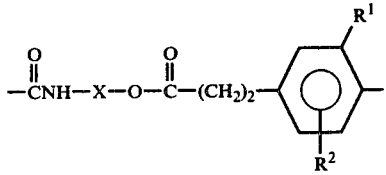

in which each $R^1$ independently is alkyl having up to about 8 carbon atoms including a tertiary carbon atom directly linked to the phenolic ring on which that $R^1$ is a substituent, each $R^2$ independently is H or alkyl having up to about 8 carbon atoms, and each X independently is a divalent hydrocarbon radical containing up to about 12 carbon atoms including from 1 to about 10 carbon atoms forming the shortest chain linking the adjacent

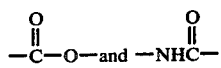

radicals in said compound.

2. A compound of claim 1 wherein X contains no olefinic unsaturation.

3. A compound of claim 2 wherein said chain contains not more than about 6 carbon atoms.

4. A compound of claim 2 wherein X contains not more than about 6 carbon atoms.

5. A compound of claim 4 wherein X is alkylene containing not more than about 1 carbon atom more than the number of carbon atoms in said chain.

6. A compound of claim 1 wherein X is non-tertiary alkylene containing not more than about 6 carbon atoms.

7. A compound of claim 6 wherein X is ethylene.

8. A compound of claim 1 wherein X is phenylene.

9. A compound of claim 8 wherein X is ortho- or meta-phenylene.

10. A compound of claim 1 wherein $R^1$ is tertiary butyl and each $R^2$ is tertiary butyl ortho to the hydroxy radical on the phenolic ring on which that $R^2$ is a substituent.

11. A compound of claim 10 wherein X contains no olefinic unsaturation.

12. A compound of claim 11 wherein X contains not more than about 6 carbon atoms.

13. A compound of claim 11 wherein said chain contains at least 2 and not more than about 6 carbon atoms.

14. A compound of claim 13 wherein X is selected from phenylene and alkylene containing not more than about 1 carbon atom more than the number of carbon atoms in said chain.

15. A compound of claim 10 wherein X is non-tertiary acyclic alkylene containing not more than about 6 carbon atoms.

16. A compound of claim 15 wherein X contains 2 or 3 carbon atoms.

17. A compound of claim 10 wherein X is ethylene.

18. A compound of claim 10 wherein X is phenylene.

19. A compound of claim 18 wherein X is meta-phenylene.

20. A compound of claim 18 wherein X is orthophenylene.

* * * * *

UNITED STATES PATENT AND TRADEMARK OFFICE
CERTIFICATE OF CORRECTION

PATENT NO. : 4,145,556
DATED : March 20, 1979
INVENTOR(S) : Richard H. Hirsch and William H. Selcer It is certified that error appears in the above-identified patent and that said Letters Patent are hereby corrected as shown below:

In column 2, line 55, the words "including from from 1" should read -- including from 1 --.

In column 4, line 45, the word "preparation" should read -- preparations --.

In column 8, line 5, the definition of Footnote 1 at end of line reads "-4-hydroxy (phenyl)pro-" and should read -- -4-hydroxyphenyl)pro- --.

Signed and Sealed this

Fourteenth Day of August 1979

[SEAL]

Attest:

LUTRELLE F. PARKER
*Attesting Officer*   *Acting Commissioner of Patents and Trademarks*